United States Patent [19]

Cruz

[11] Patent Number: 4,708,380

[45] Date of Patent: Nov. 24, 1987

[54] VEHICLE DOOR PROTECTOR

[76] Inventor: Richard Cruz, 3565 Bayonne Dr., San Diego, Calif. 92109

[21] Appl. No.: 928,192

[22] Filed: Nov. 7, 1986

[51] Int. Cl.$^4$ ............................................... B60R 13/04
[52] U.S. Cl. ..................................... 293/128; 280/770
[58] Field of Search .......................... 293/128; 280/770

[56]  References Cited

U.S. PATENT DOCUMENTS

| 3,582,134 | 6/1971 | Shaff | 293/128 |
| 3,659,887 | 5/1972 | Marquette | 293/128 |
| 4,014,583 | 3/1977 | Farbes | 293/128 |
| 4,401,331 | 8/1983 | Ziner et al. | 293/128 |

Primary Examiner—Robert R. Song
Attorney, Agent, or Firm—Brown, Martin, Haller & Meador

[57] ABSTRACT

A protective device for removable attachment to the side of vehicle which includes an elongated strip of a semi-rigid material having front and rear surfaces. The strip is removably attached to the side of the vehicle to protect the vehicle side from contact damage caused by the opening of adjacent parked vehicle doors. The protective device may further include a retainer strap coupled at one end of the strip for securing the strip to the interior structure of the vehicle.

17 Claims, 8 Drawing Figures

U.S. Patent   Nov. 24, 1987   4,708,380
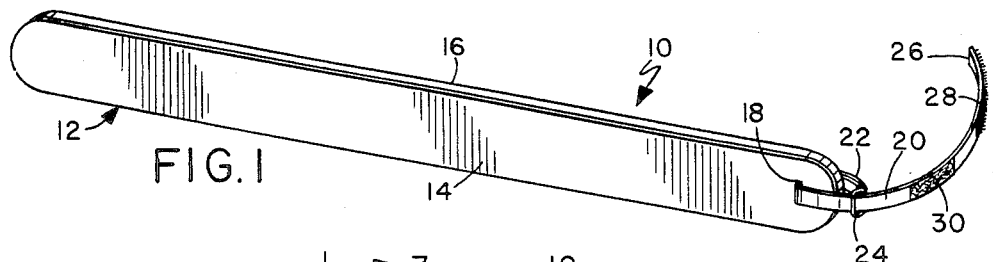
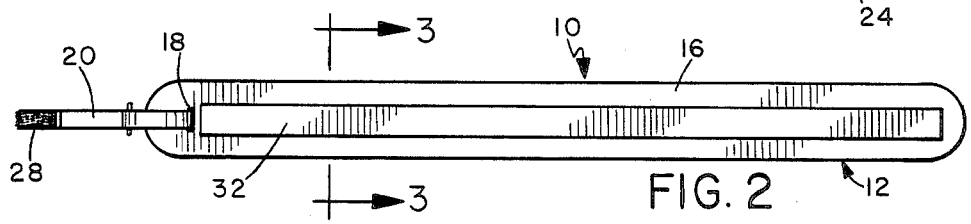
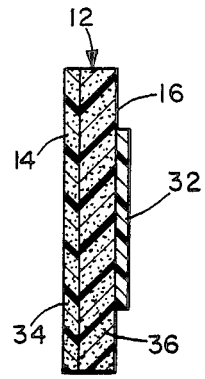
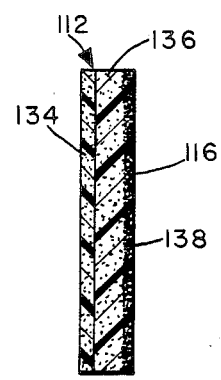
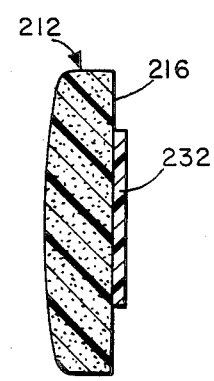
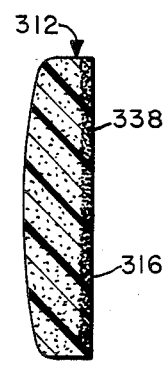
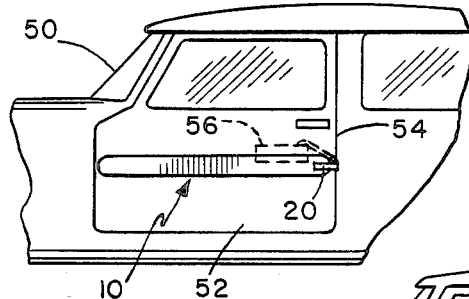
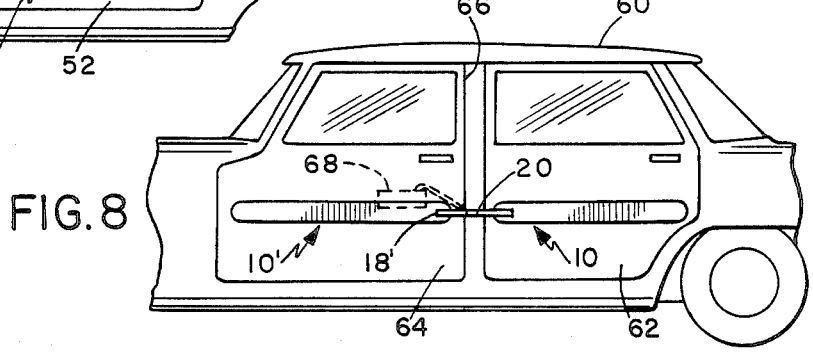

VEHICLE DOOR PROTECTOR

BACKGROUND OF THE INVENTION

I. Field of the Invention

The present invention relates to protective devices for removable attachment to the side of a vehicle. More specifically, the present invention is a new and improved vehicle door protector formed of a resilient semi-rigid material and magnetically coupled to the vehicle door.

II. Background Art

As is well known, automobiles are susceptible to small nicks and dings in side doors and fenders resulting from contact caused by the careless opening of the door of an adjacently parked vehicle. This type of damage occurs especially when vehicles are parked in parking lots having narrow parking spaces and personal garages. However, this type of minor damage to the automobile may be avoided by the use of vehicle side protectors.

Many automobile manufacturers include in the design of the vehicle rubber or plastic side protector strips permanently affixed to the sides of the vehicle. These protectors typically extend along each side of the vehicle along the front fender, doors and rear fender but do not always provide the needed protection due to the height of adjacent vehicle doors. However, many automobile manufacturers do not include such protective devices in the design of the vehicle. One reason for not including the permanently affixed side protectors is that these devices detract from the overall appearance of the vehicle. For those vehicles which do not have permanently affixed side protectors, the cumulative damage is an unsightly detraction from the overall appearance of the vehicle.

For vehicles without side protectors, it is advantageous to prevent damage by either installing a permanent protective strip which extends along the length of the vehicle, or by installing a portable protector which may be temporarily applied as desired by vehicle operator. The aftermarket permanently affixed side protectors have the inherent disadvantage in that by being permanently affixed it detracts from the overall asthetic appearance of the vehicle. It is, therefore, advantageous to have a portable vehicle side protector which is installed at the time selected by the operator and positioned where it may provide optimum protection, such as when parking in parking lots. The portable device is then removed by the operator prior to driving the vehicle.

On type of vehicle door protector currently marketed is a curtain-like protective device. This device is attached by a frame to the vehicle door at the window opening. The curtain is typically a plastic sheet which extends downwardly to cover the door. The sheet itself then may prevent nicks and dings caused by the opening of doors of closely parked cars. A disadvantage of this type of protector is that it is rather large and cumbersome to install and remove. Furthermore, the device may provide insufficient protection due to the limited thickness of the sheet and its resiliency in withstanding impact. In addition, this type of protector is limited to vehicle door applications and is incapable of protecting the fenders of the vehicle without special adaptation.

It is, therefore, an object of the present invention to provide a new and improved vehicle side protector in the form of an elongated strip of a resilient semi-rigid material which is magnetically attached to the side of the vehicle, whether or not the vehicle has permanently affixed side protection, in the location where damage from the opening of doors of an adjacent vehicle may occur.

It is yet another object of the present invention to provide a compact portable vehicle door protector which is removably attached to the exterior of the vehicle and removably secured by a strap to the interior of the vehicle.

SUMMARY OF THE INVENTION

The present invention is a protective device for removable attachment to the side of a vehicle. The protective device includes an elongated strip of a resilient semi-rigid material having front and rear surfaces and attachment means for removably attaching the strip to the side of the vehicle. The protective device may further include a retainer strap coupled adjacent one end of the strip for removably securing the strip to the interior structure of the vehicle.

In one embodiment of the invention, the elongated strip is comprised of two laminated polyolefin layers with the outer layer having a greater density than the inner layer. The strip when mounted upon the vehicle has the higher density layer facing outward from the vehicle so as to receive the contact from the opened doors of vehicles. A magnetic strip is fixed to the surface of the elongated strip that is mounted adjacent the door so as to hold the strip in position on the door. In an alternative embodiment a magnetic powder is imbedded into the strip adjacent the strip surface that is mounted adjacent the door.

BRIEF DESCRIPTION OF THE DRAWINGS

These and other features, objects and advantages of the present invention will be more fully apparent from the detailed description set forth below, taken in conjunction with the drawings in which like reference characters identify correspondingly throughout and wherein:

FIG. 1 is a perspective view of a preferred configuration of the door protector;

FIG. 2 is a rear elevation view of the door protector;

FIG. 3 is an enlarged sectional view taken on line 3—3 of FIG. 2;

FIGS. 4–6 are sectional views similar to FIG. 3, showing alternative structural arrangements;

FIG. 7 is a side elevation view of a portion of a vehicle showing the door protector attached and secured; and FIG. 8 is a side elevation view of a vehicle showing two door protectors respectively attached to the front and rear doors and connected together.

DETAILED DESCRIPTION OF THE PREFERRED EMBODIMENTS

The present invention comprises a novel and improved automobile door protector. Referring to FIGS. 1 and 2, there is shown a preferred embodiment of a vehicle door protector which consists of an elongated protective strip 12, formed from a resilient semi-rigid material, having a front surface 14 and a rear surface 16. At one end of strip 12 is a slot 18 which extends through strip 12 from front surface 14 to rear surface 16.

A retainer strap 20 is mounted at one end of strip 12 with strap 20 being threaded through slot 18. At one end of strap 20, end 22, is a metal D-shaped ring 24. At the other end of strap 20, end 26, is a section of hook-type material 28. Adjacent the section of hook-type material 26 and spaced apart therefrom along strap 20 is a section of mating loop-type material 30. Strap 20 typically has end 26 threaded through the slot 18 from rear surface 16 to front surface 14. End 26 is then threaded through ring 24.

Strap 20 is used to secure strip 12, when mounted on the vehicle, from unauthorized removal. Strap 20, as described later herein, extends through the automobile door jamb and is looped through an opening in an interior feature of the vehicle door, such as an opening in the door armrest. Section 28 is then mated with section 30 to secure the strap to the armrest. In the alternative, strap 20 may be tied to the armrest or other interior structure.

FIG. 2 illustrates a rear elevation view of door protector 10 with a flexible magnetic strip 32 adhesively bonded to surface 16. Magnetic strip 32 extends from adjacent slot 18 along the length of strip 12 to the other end thereof.

Strip 10 is typically formed from a plastic material such as a polyolefin material such as polyethylene, polystyrene and polyurethane. However, other resilient, semi-rigid materials such as rubber may be used. Strip 12 typically has rounded ends and is 40 inches in overall length, which length may be varied in manufacture according to the type of vehicle to which it is to be applied. Strip 12 is typically approximately 4 inches in width so as to provide protection against the varying heights in contact points from doors of different types of vehicles.

Strap 20 is typically a 1 inch wide section of nylon webbing. The length of strap 20 is in the range of 25 inches to 50 inches and is typically 40 inches. Sections 28 and 30 are typically sections of fabric hook and loop-type material sold under the trademark "Velcro".

Magnetic strip 32 is typically a 1.5 inch wide magnetized plastic strip sold under the name "Plastiform" by 3M Company of Minneapolis, Minn.

FIG. 3 is an enlarged sectional view taken on line 3—3 of FIG. 2 showing the construction of one embodiment of protector 10. In FIG. 3, strip 12 is of a laminate construction having a first layer 34 bonded to a second layer 36. Magnetic strip 32 is adhesively bonded to surface 16 of strip 12. Layers 34 and 36 are typically a polyethylene foam laminate construction that is die cut to achieve the overall shape of strip 12.

Layer 34 is typically a high density polyethylene foam having a density in the range of 6.0-7.0 pounds per cubic foot. Layer 36 is also a polyethylene foam having a density of 1.7-2.0 pounds per cubic foot. Layer 34 as a denser foam material, provides a resilient buffer for receiving the impact from vehicle doors while providing structural rigidity for handling the device. Layer 36 being of a lower density material permits the strip to be lightweight and still retain the semi-rigid nature of the device.

FIG. 4 illustrates an alternate embodiment of a strip, strip 112, wherein, a laminate construction is used with layer 134 being adapted for mounting on layer 136, as was described with reference to FIG. 3. Layers 134 and 136 are also of a same material as layers 34 and 36 of FIG. 3 with the exception of a magnetic powder added to layer 136. Layer 136 has disposed therein, adjacent surface 116, a magnetic powder 138 or other suitable magnetic fragments which eliminate the necessity of mounting a magnetic strip directly upon surface 116. Magnetic powder 138 may be impregnated in layer 136 during the fabrication of the foam laminate structure.

FIG. 5 illustrates a further alternate embodiment of the present invention wherein strip 212 is fabricated by injection or pour molding of a polyolefin plastic such as polyethylene, polystyrene or polyurethane, or a combination thereof. Magnetic strip 232 is then applied to surface 216 as discussed previously with reference to FIGS. 1-3.

FIG. 6 illustrates yet another alternate embodiment of the present invention where strip 312 is fabricated in accordance with the techniques used in constructing strip 212 of FIG. 5. In FIG. 6, magnetic powder 338 is embedded during the molding process adjacent surface 316, so as to eliminate the necessity of mounting a magnetic strip upon surface 316.

FIG. 7 illustrates a two door automobile with door protector 10 mounted on door 52. Door protector 10 is positioned along the length of door 52 and held in place by the magnetic strip. As shown, strap 20 extends through door jamb 54 and is coupled to armrest 56, steering wheel, door latch or any other suitable interior fixture by looping the end of strap 20 through an opening in armrest 56 and mating the "Velcro" sections. In this position, unauthorized removal or theft of the entire door protector is reduced.

FIG. 8 illustrates an alternate embodiment of using the invention wherein a pair of door protectors 10 and 10' are mounted upon a four door vehicle 60. Door protector 10 is mounted on rear door 62 while door protector 10' is mounted on front door 64. Strap 20 is secured to door protector 10, as previously described, while the free end of strap 20 is threaded through slot 18' of door protector 10'. Strap 20 is then fed through door jamb 66 and secured to armrest 68, as previously described.

In the embodiments shown herein, it is also envisioned that the structure of the strip 12 may also be of various other types of resilient, lightweight, durable materials such as corrugated paper or plastic.

The present invention, as described herein, provides a novel and improved vehicle door protector having a durable, lightweight construction. It is portable enough to allow the operator to readily apply the door protector to the door or fender of an automobile in a relatively short period of time with great ease. The use of the retaining strap is optional in many cases and may not be necessary in many situations. As such, the retaining strap is easily installed or removed from the protective strip.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment shown herein, but is to be accorded the widest scope persistent with the principles and novel features disclosed herein.

What is claimed is:

1. A protective device for removable attachment to the side of a vehicle, comprising:
   an elongated strip of a resilient semi-rigid material having front and rear surfaces;

attachment means for removably attaching said strip to the side of a vehicle; and retainer means coupled adjacent one end of said strip for removably securing said strip to a vehicle, said retainer means comprising a flexible strap coupled at one end to said strip one end with a first section of material of at least one of hook-type and loop-type materials mounted upon said strap adjacent the strap other end with a second section of material of the other of a hook-type and loop-type materials mounted upon said strap between said strap one end and said first section of material.

2. The device of claim 1 wherein said strip comprises first and second polyolefin layers each having front and rear surfaces, said first layer rear surface fixed to said second layer front surface, said first layer front surface and said second layer rear surface respectively defining said strip front and rear surfaces.

3. The device of claim 2 wherein said first layer has a greater density than said second layer.

4. The device of claim 1 wherein said strip is comprised of corrugated paper.

5. The device of claim 1 wherein said attachment means comprises a flexible magnetic strip fixed to said strip rear surface and extending substantially the length of said strip.

6. The device of claim 1 wherein said attachment means comprises a magnetic powder disposed in said strip adjacent said rear surface.

7. The device of claim 1 further comprising an additional elongated strip of a semi-rigid material having front and rear surfaces and attachment means for removably attaching said additional strip to the side of a vehicle, wherein said retainer means is coupled adjacent one end of said additional strip for securing both strips to a vehicle.

8. A protective device for removable attachment to the side of a vehicle to prevent dents and marks to the vehicle side, comprising:

an elongated resilient semi-rigid polyolefin strip having front and rear surfaces and a slot through said semi-rigid strip between said front and rear surfaces adjacent one end of said semi-rigid strip;

a flexible magnetic strip fixed to said semi-rigid strip rear surface and extending substantially the length of said semi-rigid strip; and a flexible woven fabric strap having a D-shaped ring mounted at one end of said strap with a section of hooktype material mounted at the other end of said strap with a section of loop-type material mounted along said strap spaced apart from said section of hook-type material, wherein said strap is threaded through said slot with the strap other end threaded through said D-shaped ring.

9. The device of claim 8 wherein said semi-rigid strip comprises first and second polyolefin layers each having front and rear surfaces, said first layer rear surface fixed to said second layer front surface, said first layer front surface and said second layer rear surface respectively defining said semi-rigid strip front and rear surfaces.

10. The device of claim 9 wherein said first layer has a greater density than said second layer.

11. The device of claim 10 wherein said first layer is polyethylene foam having a density in the range of 1.7 to 2.0 pounds per cubic foot and said second layer is a polyethylene foam having a density in the range of 6.0 to 7.0 pounds per cubic foot.

12. The device of claim 8 wherein said semi-rigid strip is formed from a polyolefin material selected from the group consisting of polyethylene, polystyrene and polyurethane.

13. A protective device for removable attachment to the side of a vehicle to prevent dents and marks to the vehicle side comprising:

a first elongated resilient semi-rigid polyolefin strip having front and rear surfaces and a slot through said first strip between said first strip front and rear surfaces adjacent one end of said first strip;

a second elongated resilient semi-rigid polyolefin strip having front and rear surfaces and a slot through said second strip between said second strip front and rear surfaces adjacent one end of said second strip;

a flexible magnetic strip fixed to said first strip rear surface and extending substantially the length of said first strip;

an additional flexible magnetic strip fixed to said second strip rear surface and extending substantially the length of said second strip; and a flexible woven fabric strap having a D-shaped ring mounted at one end of said strap with a section of hook-type material mounted at the other end of said strap with a section of loop-type material mounted along said strap spaced apart from said section of hook-type material, wherein said strap is threaded through said first strip slot with the strap other end respectively threaded through said D-shaped ring and said second strap slot.

14. The device of claim 13 wherein each of said first and second strips respectively comprise first and second polyolefin layers each having front and rear surfaces, each first layer rear surface fixed to a corresponding second layer front surface, each first layer front surface and each second layer rear surface respectively defining front and rear surfaces of a corresponding one of said first and second strips.

15. The device of claim 14 wherein each of said first layers has a greater density than each of said second layers.

16. The device of claim 15 wherein each of said first layers is polyethylene foam having a density in the range of 1.7 to 2.0 pounds per cubic foot and each of said second layers is a polyethylene foam having a density in the range of 6.0 to 7.0 pounds per cubic foot.

17. The device of claim 13 wherein each of said first and second strips is formed from a polyolefin material selected from the group consisting of polyethylene, polystyrene and polyurethane.

* * * * *